(12) United States Patent
Ziegler

(10) Patent No.: US 7,600,825 B2
(45) Date of Patent: Oct. 13, 2009

(54) HYDRAULIC RELEASE SYSTEM WITH MANUALLY OPERATED HYDRAULIC LOCK VALVE FOR SPRING-APPLIED, HYDRAULICALLY-RELEASED PARKING BRAKE SYSTEM

(75) Inventor: Douglas Jon Ziegler, Champlin, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 384 days.

(21) Appl. No.: 11/422,992

(22) Filed: Jun. 8, 2006

(65) Prior Publication Data

US 2007/0284938 A1    Dec. 13, 2007

(51) Int. Cl.
*B60T 13/74* (2006.01)
(52) U.S. Cl. .................. 303/3; 303/71; 303/76
(58) Field of Classification Search .......... 303/3, 303/11, 15, 9.76, 71, 75, 76, 77
See application file for complete search history.

(56) References Cited

U.S. PATENT DOCUMENTS

| | | | |
|---|---|---|---|
| 4,158,470 A * | 6/1979 | Koenig | .......... 303/71 |
| 4,195,716 A | 4/1980 | Wirt | |
| 5,984,425 A | 11/1999 | Orzal | |
| 6,170,922 B1 | 1/2001 | Vannorsdel et al. | |
| 6,715,590 B2 | 4/2004 | Tabor | |
| 2005/0023892 A1 | 2/2005 | Claussen et al. | |
| 2006/0071546 A1* | 4/2006 | Inagaki et al. | .......... 303/115.1 |

* cited by examiner

*Primary Examiner*—Thomas J Williams
(74) *Attorney, Agent, or Firm*—Renner, Otto, Boisselle & Sklar, LLP

(57) ABSTRACT

A hydraulic manifold assembly for use in a hydraulic release system operable to control a spring applied, hydraulically released parking brake assembly, includes a manifold block and a manually operated hydraulic lock valve assembled in the manifold block. The manifold block includes a high pressure inlet port, an actuator port for connection to a brake release actuator, an outlet port for connecting to a hydraulic fluid reservoir, and an internal passage connecting an actuator port to the outlet port. The manually operated lock valve is manually movable between an open position allowing flow of hydraulic fluid from the actuator port to outlet port and a closed position blocking flow of hydraulic fluid from the actuator port to the outlet port, the hydraulic lock valve in its closed position containing pressurized fluid in the actuator to keep the brake released.

8 Claims, 2 Drawing Sheets

HYDRAULIC RELEASE SYSTEM WITH MANUALLY OPERATED HYDRAULIC LOCK VALVE FOR SPRING-APPLIED, HYDRAULICALLY-RELEASED PARKING BRAKE SYSTEM

The invention herein described relates generally to vehicles, particularly recreational vehicles (RVs), including spring-applied, hydraulically-released parking brake systems and, more particularly, to a hydraulic release system with a manually operated hydraulic lock valve that can be closed to contain pressurized fluid in the brake release actuator(s) for releasing the parking brake(s) to permit movement of the vehicle during vehicle assembly.

BACKGROUND OF THE INVENTION

Many vehicles heretofore have employed spring-applied, hydraulically-released (SAHR) parking brake systems. In these systems, a brake such as shoe assembly or a disk assembly is engaged under the force of a spring which permanently biases the brake towards its applied or engaged position. The brake is released by hydraulic pressure generated by a pump driven directly or indirectly by the vehicle's engine.

SAHR parking brake systems have included brake override assemblies to permit manual brake override for vehicle towing or assisted transport when the engine is not running, the pump fails, or when the vehicle otherwise is incapable of transmitting hydraulic pressure to the brakes. One such brake override assembly is disclosed in U.S. Pat. No. 4,195,716, wherein a brake override assembly includes a manual cut-off valve and a manual hydraulic pump. The cut-off valve is located in a conduit leading from the system's brake control mechanism to the brake release actuators. The pump is disposed in an auxiliary conduit fluidically coupled to the brake release actuators. To release the brakes for towing or assisted transport, the cut-off valve is closed, and the pump is actuated to pressurize the brake release actuators and, hence, to release the brakes. The brakes remain disengaged unless and until the override valve is manually reset to its normal operating position in which fluid may flow from the brake release actuators to the vehicle's reservoir or tank.

U.S. Pat. No. 5,984,425 discloses a SAHR parking and emergency brake system that can be manually overridden to permit towing or assisted vehicle transport when pump pressure is unavailable for the brakes, and reset either automatically when pump pressure becomes available or manually. Override is made possible by a manual override assembly that includes a manually-actuated hand pump and an override valve. The override valve is manually actuated to isolate the brake release actuators and the outlet of the hand pump from the system's reservoir and is reset to its open position in response to the presence of hydraulic pressure at a designated location of the braking system. Automatic reset of the override valve preferably is effected by the supply of pressurized fluid to a previously unpressurized port of the override valve. The hand pump, override valve, and any other brake control valve(s) of the braking system may be incorporated into a single control module.

SUMMARY OF THE INVENTION

The present invention addresses a problem different from those addressed by the above-discussed '716 and '425 patents. Many recreational vehicles (RVs) are equipped with SAHR parking brake systems. Because of the large size of the RV, typically the RVs are moved during assembly from assembly station to assembly station by rolling the vehicle. Obviously, a problem is presented if the parking brakes are in their normal unreleased state. The present invention provides a means by which a parking brake can be maintained in a released condition during vehicle assembly, and then later restored to their normal operating condition. Accordingly, the invention provides a hydraulic manifold assembly for use in a hydraulic release system operable to control a spring applied, hydraulically released parking brake assembly wherein a brake is movable between an applied position and a released position, a spring biases the brake towards the applied position, and a brake release actuator is selectively operable to release said brake against an application force imposed by said spring. The hydraulic manifold assembly comprises a manifold block and a manually operated hydraulic lock valve assembled in the manifold block. The manifold block includes a high pressure inlet port, an actuator port for connection to the brake release actuator, an outlet port for connecting to a hydraulic fluid reservoir, and an internal passage connecting the actuator port to the outlet port. The manually operated hydraulic lock valve is manually movable between an open position allowing flow of hydraulic fluid from the actuator port to outlet port and a closed position blocking flow of hydraulic fluid from the actuator port to the outlet port, whereby the hydraulic lock valve can be manually moved to its closed position to contain pressurized fluid in the actuator to keep the brake released, and manually moved to its open position for normal operation of the hydraulic release system.

The lock valve preferably includes an annular seal retained in an annular groove for sealing against a cylindrical sealing surface of the manifold block. The lock valve may be fully contained within a port in the manifold block where it is in threaded engagement with a threaded section of the port such that rotation of the lock valve in opposite directions opens and closes the lock valve. A retention clip may be provided in the port for defining an open position of the lock valve.

The invention also encompasses the hydraulic manifold assembly in combination with the hydraulic release system, and further in combination with the spring applied, hydraulically released parking brake assembly.

Further features of the invention will become apparent from the following detailed description when considered in conjunction with the drawings.

BRIEF DESCRIPTION OF THE DRAWINGS

An exemplary embodiment of the invention is illustrated in the accompanying drawings in which.

DETAILED DESCRIPTION

Figure 1:
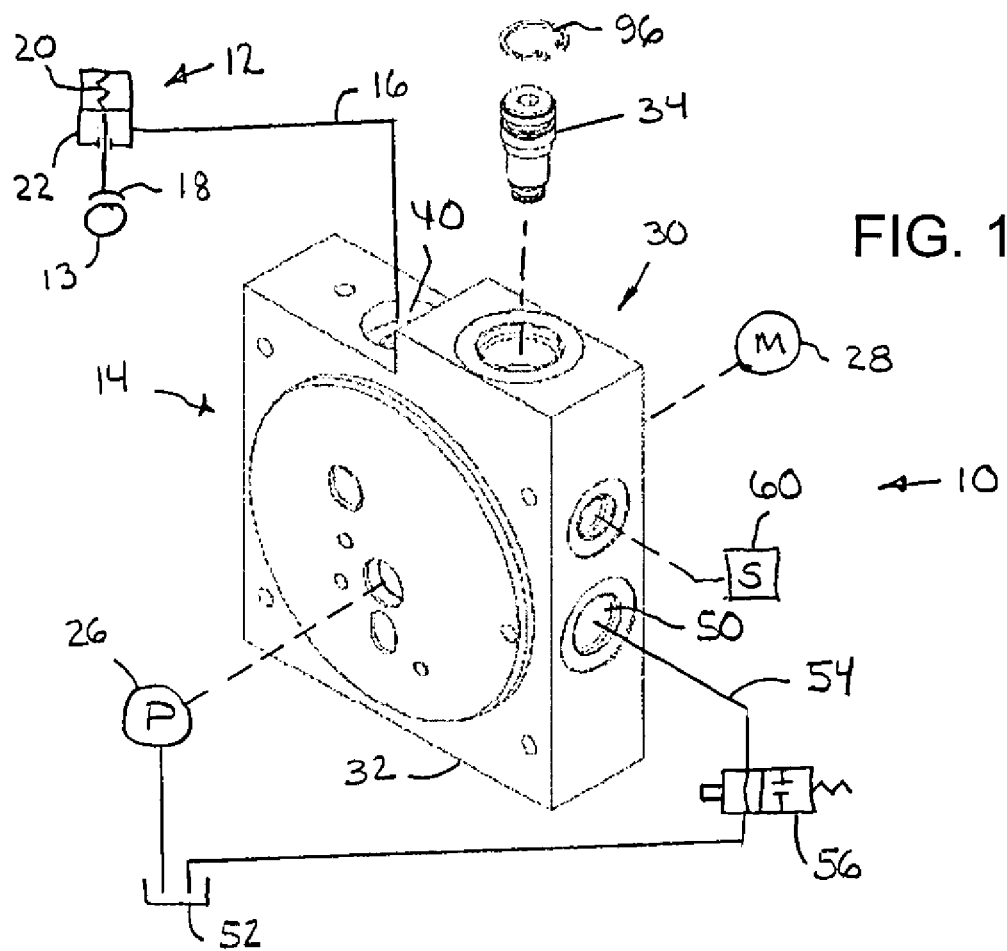
FIG. 1 is a diagrammatic illustration of a spring-applied, hydraulically-released parking brake system according to the invention, wherein a block and lock valve of a hydraulic manifold block assembly according to the invention are shown in exploded perspective view.

Referring now in detail to the drawings and initially to FIG. 1, a spring-applied, hydraulically-released (SAHR) parking brake system is indicated generally at 10. The system is intended for use in a vehicle such as a recreational vehicle. The parking brake system 10 generally comprises at least one brake assembly 12 associated with a drive shaft 13 (or wheel (s)) of the vehicle and a hydraulic release system 14 coupled to the brake assembly by a supply conduit 16. The brake assembly 12 includes a brake 18, a spring 20 which biases the brake 18 towards an applied position, and a brake release actuator 22. The hydraulic release system 14 includes a pump 26 (or other source of pressurized hydraulic fluid), a motor 28 for driving the pump 26, and a manifold block assembly 30. The manifold block assembly 30 includes a manifold block (body) 32 and a hydraulic lock valve 34.

Figure 2:
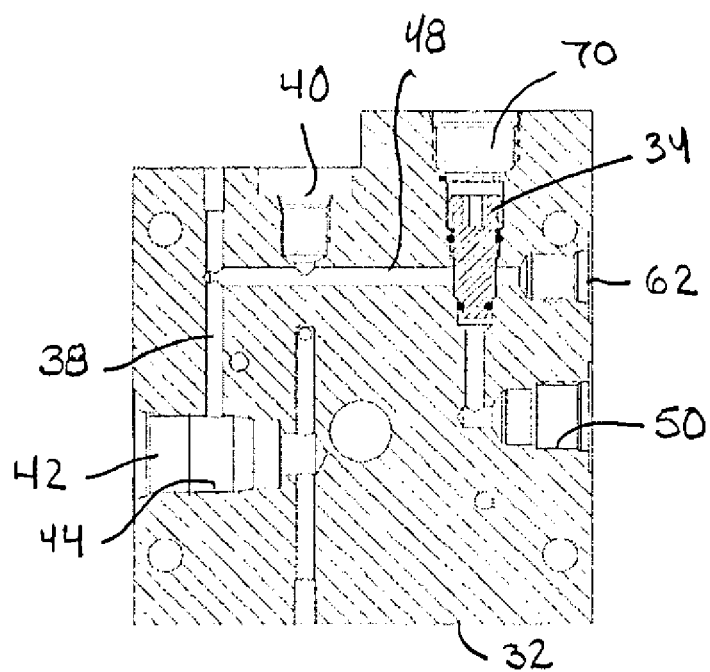
FIG. 2 is a cross-sectional view of the hydraulic manifold assembly with the lock valve assembled in the manifold block.
Figure 3:
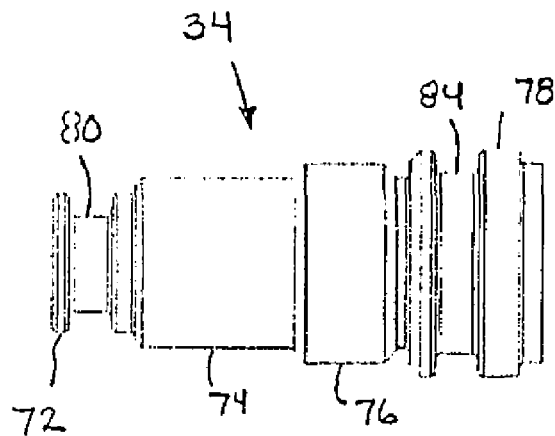
FIG. 3 is a side elevational view of the lock valve.
Figure 4:
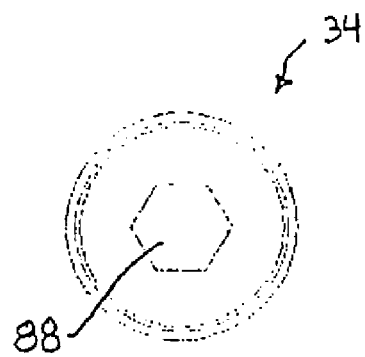
FIG. 4 is an end view of the lock valve.

With additional reference to FIG. 2, the manifold block 32 includes an inlet flow passage 38 connecting the high pressure output side of the pump 26 to the supply conduit 16 that is connected to the manifold block at an actuator output port 40. The flow passage 38 may be provided with a pressure holding check valve 42 installed in a check valve port 44 in the manifold block. The check valve 42 prevents reverse flow of fluid from the actuator 22 to the pump when the pump is not being operated.

The manifold block 32 also includes an outlet flow passage 48 connecting the actuator output port 40 (and thus the supply conduit 26) to an outlet port 50. The outlet port 50 is connected to a hydraulic fluid reservoir 52 by a conduit 54 including a brake control valve 56. The brake control valve 56 preferably is a normally open solenoid valve. The solenoid valve may be opened and closed by a suitable brake controller respectively to allow and block flow of hydraulic fluid from the actuator port to the reservoir.

In operation, the pump 26 may be driven by the motor 28 to supply high pressure fluid to the brake release actuator 22. With the solenoid valve 56 closed, pressure will build up at the actuator 22 and overcome the biasing force of the spring 20, thereby disengaging the parking brake 18. Upon build up of sufficient pressure, the motor can be turned off. The high pressure fluid will remain trapped in the actuator by reason of the closed solenoid valve and the check valve 42, thereby holding the brake in its disengaged position. A pressure sensor 60 may be installed in a pressure sensor port 62 to sense the pressure in the passage 48 and thus the pressure in the actuator when the control valve 56 is closed.

During assembly of the vehicle in which the SAHR brake system 10 is installed, it is desirable to maintain the brake 18 in its released/disengaged position so that the vehicle can be rolled on its wheels between assembly stations. At such time the control circuitry for brake control valve will typically not have been installed on the vehicle.

In accordance with the present invention, the hydraulic lock valve 34 is provided in the passage 48 between the actuator 22/actuator port 40 and the control valve 56/outlet port 50. As shown, the lock valve 34 is installed in a port 70.

With reference to FIGS. 3-6, the lock valve includes an axially inner sealing end portion 72, an intermediate portion 74, a threaded portion 76, and an outer sealing portion 78. The inner sealing portion 72 includes an annular groove 80 for receiving an annular seal such as an O-ring 82, and the outer sealing portion likewise includes an annular groove 84 for receiving an annular seal such as an O-ring 86. The outer axial end of the valve is provided with a wrench engaging device, such as a hex socket 88, for enabling manual rotation of the valve by means of a suitable tool, such as an Allen wrench.

The lock valve port 70 has an axially inner passage sealing surface 90 that preferably is cylindrical. Axially outwardly of the sealing surface the valve port 70 has a threaded section 92 in which the threaded portion 76 of the valve is threaded.

Figure 5:
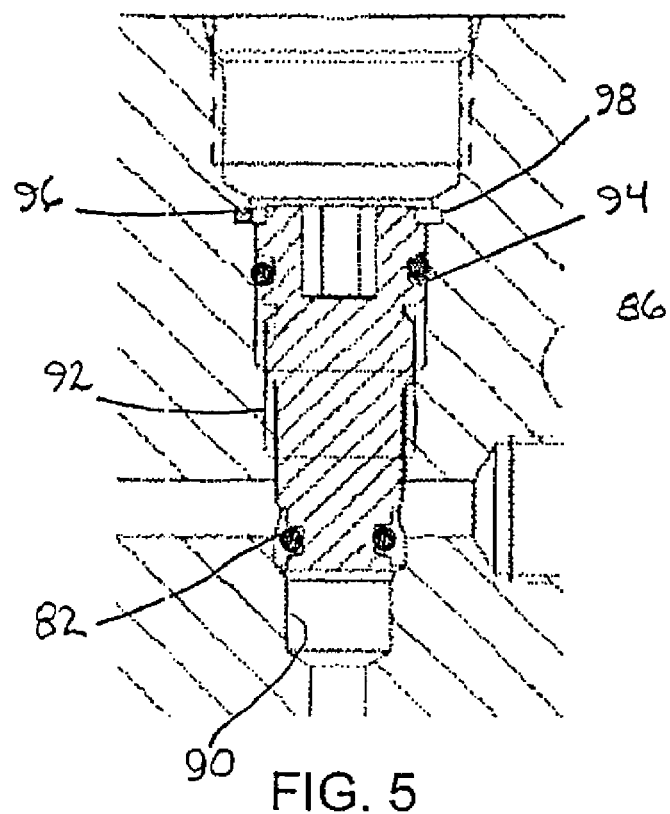
FIG. 5 is an enlarged fragmentary cross-sectional view of the manifold block assembly with the lock valve in its open position.
Figure 6:
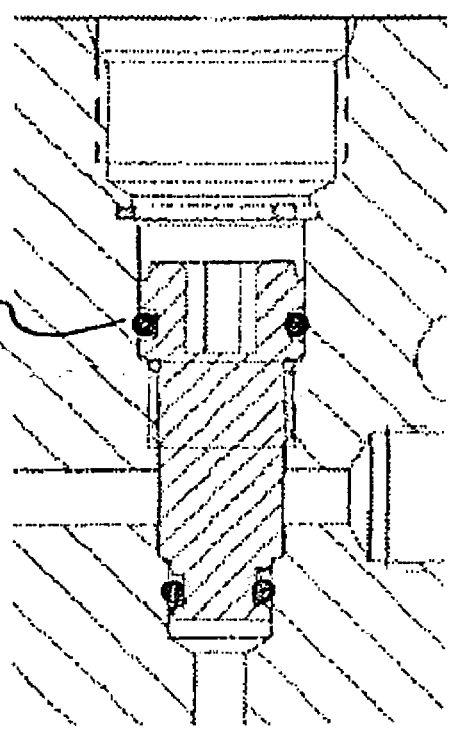
FIG. 6 is a view similar to FIG. 5 with the lock valve in its closed position.

Consequently, rotation of the valve in one direction will move the valve axially inwardly to move the seal 82 into sealing engagement with the sealing surface 90 for blocking flow from the actuator 22 to the outlet port 50, as seen in FIG. 6. Rotation of the valve in the opposite direction will move the valve axially outwardly to move the seal out of engagement with the sealing surface 90 as seen in FIG. 5, thereby opening the lock valve to allow for flow from the actuator to the outlet port.

Leakage of fluid along the valve is precluded by the seal 86 engaging a preferably cylindrical sealing surface 94 of the port 70 axially outwardly of the threaded section.

The lock valve 34 preferably is fully contained within the port 70 whether open or closed. As shown, axially outward withdrawal of the lock valve 34 may be limited by a retainer, such as a C-clip 96 installed in an annular groove 98 in the lock valve port 70.

In use, the lock valve can be manually rotated to its closed position blocking flow of fluid from the actuator 22 to the outlet port 50. The pump can then be operated by temporarily energizing the motor to supply pressurized fluid to the brake release actuator 22 to disengage the brake 18. Once the brake has been disengaged, the motor can be de-energized and the pressured fluid will remain trapped in the actuator until the lock valve is manually opened. Consequently, the vehicle can be rolled on its wheels from assembly station to assembly station during vehicle construction. Upon completion of the vehicle, the lock valve is manually opened whereupon the parking brake can be operated in its normal manner. The O-ring seals 82 and 86 provide static sealing of hydraulic fluid in the system and contain the hydraulic pressure.

The illustrated lock valve 34 is preferred over the use of needle valves which are more expensive and require closer tolerances for shutting off flow. Another advantageous feature is the lock valve is fully contained within the manifold block 32. Another desirable feature is the avoidance of any requirement for dynamic components such as springs, poppets, spools, etc., thereby reducing the cost and complexity of the lock valve 34. In addition, the open position of the lock valve is preferably defined by the manifold by reason of the retainer stop 96.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic manifold assembly for use in a hydraulic release system operable to control a spring applied, hydraulically released parking brake assembly wherein a brake is movable between an applied position and a released position, a spring biases the brake towards the applied position, and a brake release actuator is selectively operable to release said brake against an application force imposed by said spring, the hydraulic manifold assembly comprising a manifold block including a high pressure inlet port, an actuator port for connection to the brake release actuator, an outlet port for connecting to a hydraulic fluid reservoir, and an internal passage connecting the actuator port to the outlet port; and a manually operated hydraulic lock valve assembled in the manifold block, the manually operated hydraulic lock valve being manually movable between an open position allowing flow of hydraulic fluid from the actuator port to outlet port and a closed position blocking flow of hydraulic fluid from the actuator port to the outlet port, whereby the hydraulic lock valve can be manually moved to its closed position to contain pressurized fluid in the actuator to keep the brake released, and manually moved to its open position for normal operation of the hydraulic release system, and wherein the lock valve is threadedly engaged with a threaded section of a port in the manifold block such that rotation of the lock valve in opposite directions opens and closes the lock valve.

2. The hydraulic manifold assembly of claim 1, wherein lock valve is fully contained within a port in the manifold block.

3. The hydraulic manifold assembly of claim 1, wherein the lock valve includes an annular seal retained in an annular groove for sealing against a cylindrical sealing surface of the manifold block.

4. The hydraulic manifold assembly of claim 1, wherein a retention clip is provided in the port for defining an open position of the lock valve.

5. The hydraulic manifold assembly of claim 1, in combination with the hydraulic release system.

6. The combination of claim 5, in combination with the spring applied, hydraulically released parking brake assembly.

7. The combination of claim 6, wherein the lock valve includes an annular seal retained in an annular groove for sealing against a cylindrical sealing surface of the manifold block.

8. The combination of claim 5, wherein the lock valve includes an annular seal retained in an annular groove for sealing against a cylindrical sealing surface of the manifold block.

* * * * *

UNITED STATES PATENT AND TRADEMARK OFFICE
CERTIFICATE OF CORRECTION

PATENT NO. : 7,600,825 B2
APPLICATION NO. : 11/422992
DATED : October 13, 2009
INVENTOR(S) : Douglas Jon Ziegler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 511 days.

Signed and Sealed this

Fifth Day of October, 2010

David J. Kappos
*Director of the United States Patent and Trademark Office*